United States Patent [19]

Baur et al.

[11] Patent Number: 4,816,553

[45] Date of Patent: Mar. 28, 1989

[54] POLYACETALS, PREPARATION THEREOF FROM DIALDEHYDES AND POLYOLCARBOXYLIC ACIDS, AND USE OF SAME

[75] Inventors: Richard Baur, Mutterstadt; Rolf Fikentscher; Alfred Oftring, both of Ludwigshafen; Felix Richter, Bruehl; Wolfgang Trieselt, Ludwigshafen; Paul Diessel; Ekhard Winkler, both of Mutterstadt; Johannes Perner, Neustadt, all of Fed. Rep. of Germany

[73] Assignee: BASF Aktiengesellschaft, Ludwigshafen, Fed. Rep. of Germany

[21] Appl. No.: 156,686

[22] Filed: Feb. 17, 1988

[30] Foreign Application Priority Data

Feb. 25, 1987 [DE] Fed. Rep. of Germany ....... 3706036

[51] Int. Cl.$^4$ .............................................. C08G 16/02
[52] U.S. Cl. .................................. 528/245; 528/239; 528/242; 252/174.21
[58] Field of Search ................. 528/245, 361, 239, 242

[56] References Cited

U.S. PATENT DOCUMENTS 3,242,161 3/1966 Borchert ........................ 528/245 X
4,201,858 5/1980 Crutchfield et al. ........... 528/245 X
4,225,685 9/1980 Dyroff et al. ................... 528/245 X
4,303,777 12/1981 Crutchfield et al. ........... 528/245 X Primary Examiner—Earl Nielsen
Attorney, Agent, or Firm—Bill C. Panagos; Joseph D. Michaels

[57] ABSTRACT

Polyacetals obtainable by reaction of
(a) a dialdehyde of the formula

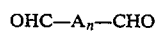

where
A = $C_1$-$C_4$-alkylene or

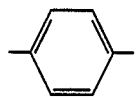

and
n is 0 or 1, is reacted with
(b) a polycarboxylic acid of 5 to 7 carbon atoms which contains not less than 3 OH groups, in a molar ratio (a):(b) of 1:0.25 to 4 in an aqueous medium in the presence of an acid catalyst, are used as additives in washing agents and as complexing agents for heavy metal ions.

7 Claims, No Drawings

POLYACETALS, PREPARATION THEREOF FROM DIALDEHYDES AND POLYOLCARBOXYLIC ACIDS, AND USE OF SAME

Legislation in many countries makes it necessary to substantially reduce the phosphate content in washing agents or to supply phosphate-free washing agents. If the phosphate content in washing agents is reduced, the washing action of the products suffers. As a result there is a demand for replacements which can take the place of all of or some of the phosphate in washing agents.

It is an object of the present invention to provide new substances which can be used for example as additives in reduced phosphate or phosphate-free washing agents and which improve the washing action of said washing agents.

We have found that this object is achieved with a polyacetal obtainable by reaction of
(a) a dialdehyde of the formula

where
A is

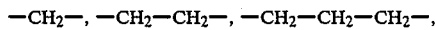

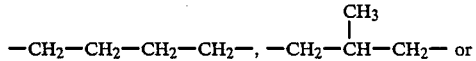

and n is 0 or 1, with
(b) a polyolcarboxylic acid of 5 to 7 carbon atoms which contains not less than 3 OH groups,
in a molar ratio of (a):(b) of 1:0.25 to 4 in an aqueous medium in the presence of an acid catalyst.

The polyacetal is prepared by reacting
(a) a dialdehyde of the formula

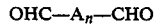

where
A is

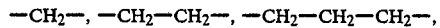

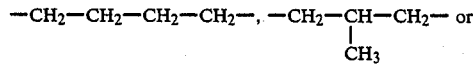

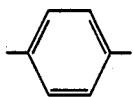

and
n is 0 or 1, with
(b) a polycarboxylic acid of 5 to 7 carbon atoms which contains not less than 3 OH groups,
in a molar ratio of (a):(b) of 1:0.25 to 4 in an aqueous medium at up to 140° C. in the presence of an acid catalyst and removing water from the reaction mixture during or after the reaction. The components (a) and (b) are preferably made to react in a weight ratio of 1:0.5 to 2 at from 60° to 110° C.

Suitable dialdehydes for use as component (a) are for example glyoxal, malondialdehyde, succindialdehyde, glutardialdehyde, adipindialdehyde and terephthaldialdehyde. Even mixtures of the dialdehydes mentioned can be used in the synthesis of the polyacetal. It is also possible to use derivatives of dialdehydes which, under the conditions of the synthesis, decompose into the parent dialdehydes, for example open-chain acetals, such as glyoxal tetramethyl acetal, glyoxal tetraethyl acetal or glutardialdehyde tetramethyl acetal, hemiacetals, such as 2,3-dihydroxy-1,4-dioxane, and disulfates of dialdehydes, for example glyoxal disulfate. Preferably, the dialdehydes used in the synthesis of the polyacetal comprise aqueous solutions of glyoxal, glutardialdehyde or terephthaldialdehyde and also mixtures of glyoxal and glutardialdehyde, mixtures of glyoxal and terephthaldialdehyde, mixtures of glutardialdehyde and terephthaldialdehyde and and also mixtures of glyoxal, glutardialdehyde and terephthaldialdehyde.

Polycarboxylic acids suitable for use as component (b) are derived from mono- or dicarboxylic acids which contain 5 to 7 carbon atoms and not less than 3 OH groups in the molecule. They comprise for example the following sugar acids: ribonic acid, lyxonic acid, mannonic acid, altronic acid, allonic acid, gluconic acid, 2-ketogluconic acid, 2,5-diketogluconic acid, gulonic acid, idonic acid, xylonic acid, talonic acid, galactonic acid, mannosaccharic acid, glucaric acid, galactaric acid, allomucic acid, glucoheptonic acid, talomucic acid, idosaccharic acid and lactones or dilactones thereof. Preferably, component (b) is gluconic acid and/or glucoheptonic acid.

The components (a) and (b) are made to react with each other in a molar ratio of 1:0.25 to 4, preferably a molar ratio of 1:0.5 to 2. To ensure as complete a reaction as possible, the reaction is carried out in the presence of an acid catalyst. This catalyst is a strong, non-volatile acid which has a $pK_a$ value below 1. Suitable catalysts are for example p-toluenesulfonic acid, sulfuric acid, amidosulfuric acid, methanesulfonic acid and benzenesulfonic acid.

Suitable acid catalysts also include ion exchangers which contain acidic groups, for example $SO_3H$ or COOH groups. The catalysts are used in an amount from 0.5 to 10, preferably from 1 to 5, % by weight based on components (a) and (b) used in the reaction. The reaction can be carried out within a wide temperature range for example from 25° to 140° C., preferably at from 60° to 110° C. If the temperature should be above the boiling point of the particular reaction mixture used, the reaction is carried out under superatmospheric pressure, for example in an autoclave. Customarily the reaction will be carried out under atmospheric pressure, but it can also be carried out under reduced pressure. The reaction of components (a) and (b) takes place in an aqueous medium at a concentration of components (a) and (b) together from 20 to 80, preferably from 30 to 70, % by weight. The reaction can also be carried out in the presence of an inert organic solvent in which the polyacetal is insoluble. It is then obtained in a finely divided form. Suitable inert organic solvents comprise not only aliphatic but also aromatic hydrocarbons, for example pentane, hexane, cyclohexane, heptane, n-octane, iso-octane, nonane, decane, methylcyclohexane, benzene, toluene, o-xylene, p-xylene, m-xylene, ethylbenzene and isopropylbenzene. It is also possible to use chlorinated hydrocarbons, such as chloroform, carbon tetrachloride, methylene chloride and tetrachloroethane, as inert organic solvents. The weight ratio of the amount of inert organic solvent:the amount of water used ranges from about 10:1 to about 1:10, and preferably is within the range from 5:1 to 1:2. The water used as solvent and the water formed in the course of the reaction of (a) with (b) is removed from the reaction mixture to prepare the polyacetal. The amount of water formed per mole of polycarboxylic acid, i.e. component (b), and removed from the reaction mixture in the course of the preparation of the polyacetal from (a) and (b) ranges from 0.5 to 3.5, preferably from 1.0 to 3.0, moles.

The reaction of components (a) and (b) can additionally be carried out in the presence of a water-in-oil emulsifier. The HLB value of the water-in-oil emulsifier is within the range from 2 to about 8. Concerning the definition of the HLB value, reference is made to the paper by W. C. Griffin in J. Soc. Cosmet. Chem. 5, (1954), 249. Suitable water-in-oil emulsifiers from the stated HLB range are for example triethanolamine oleate, oleic diethanolamide, sorbitan monooleate, sorbitan tristearate, mannitol monooleate, glycerol monooleate and glycerol dioleate.

The water-in-oil emulsifier is used in an amount from 0 to 30, preferably from 1 to 10, % by weight, based on the amount of water present in the course of the polyacetal formation. Aside from the water-in-oil emulsifiers mentioned, it also possible to use emulsifiers having an HLB value of more than 8, for example polyethoxylated alkylphenols, sulfates thereof, $C_{10}$-$C_{20}$-alkyl sulfonates, alkali metal, ammonium and amine soaps, sulfated or sulfonated oils, alkali metal salts of alkylarylsulfonic acids, salts of long-chain amines, for example oleylamine acetate, ethylene oxide adducts on $C_6$-$C_{22}$ fatty alcohols or ethylene oxide adducts on fatty acid amides derived from fatty acids of 10 to 18 carbon atoms. The ethylene oxide adducts on alkylphenols, fatty alcohols or fatty acid amides contain from 5 to 40 ethylene oxide units in the molecule.

The reaction of the dialdehyde with the polyolcarboxylic acid can be carried out continuously or batchwise. For example, a portion of an aqueous solution of a dialdehyde and a polycarboxylic acid can be introduced initially into a reactor and be reacted to completion at from 25° to 140° C. and subsequently the remaining portion to be added batchwise or continuously to form the polyacetal. The catalyst can for example be introduced initially or, alternatively, be metered into the reactor together with one or both of the reaction components. The water is distilled out of the reactor during or after the polyacetal formation. However, it is also possible first to introduce a water-in-oil emulsion into the reactor and to add components (a) and (b) separately or mixed. A catalyst can even be introduced initially together with the water-in-oil emulsion or be metered into the reactor together with components (a) and (b) or, alternatively, separately therefrom. If an inert organic solvent or solvent mixture is used in the polyacetal formation, polyacetal formation and removal of water from the system preferably take place simultaneously. This removal of water from the reaction mixture is performed azeotropically. The polyacetal is then obtained in a finely divided form. It will be readily understood that it is necessary to ensure thorough mixing of the components during the reaction, for example by stirring the reaction mixture. In order that the polyacetal, on using an inert organic solvent in which it is insoluble, shall precipitate in finely divided form, it is preferable to use the abovementioned emulsifiers and, if necessary, wetting agents. The polyacetal obtained is soluble in water. The viscosity of 40% strength aqueous solutions at 25° C. is for example from 5 to 1,000 mPas and in some cases even more than 1,000 mPas, for example 1,800 mPas. Thus pure polyacetals have no definite melting point below 300° C. The IR spectrum of a polyacetalcarboxylic acid generally shows vibration bands at 3430 cm$^{-1}$ (broad), 2930 cm$^{-1}$, 1780 cm$^1$ and 1740 cm$^{-1}$ and several bands between 1200 and 1000 cm$^{-1}$ and also at 930 cm$^{-1}$.

The polyacetal from the abovementioned aldehydes and polyolcarboxylic acids can be used for various purposes. The polyacetal is capable not only of dispersing solids but also of complexing heavy metal ions. It is therefore suitable for example for use as an additive in peroxide-containing washing and bleaching liquors. The polyacetal has strong complexing properties with respect to iron, nickel, manganese, copper, calcium, magnesium and chromium ions.

The polyacetal described above is also suitable for use as an additive in washing agents. On using the polyacetal, an increase in the washing action of low-phosphate and phosphate-free washing agent formulations is observed. The graying of white textile material is suppressed, and the incrustation of textiles washed with phosphate-free or low-phosphate washing agents in the presence of the polyacetal diminishes. The polyacetal is used for example in washing agent formulations as a builder in an amount from 1 to 15% by weight, based on the washing agent formulation. Here the polyacetal should be considered as a replacement for the phosphates used heretofore.

The particular advantage of the polyacetal over the phosphates is that the polyacetal is biodegradable. The polyacetal described above can also be used together with commercial incrustation inhibitors in washing agent formulations. Suitable incrustation inhibitors are described for example in U.S. Pat. No. 3,308,067 and EP Patent No. 75,820. Incrustation inhibitors are for example polymers of maleic acid or copolymers of acrylic acid and/or methacrylic acid with maleic acid, or homopolymers of acrylic acid. The copolymers mentioned can be used either in the form of the acids, in the form of the salts or in partially neutralized form. They are present in washing agent formulations in an amount from 1 to about 10% by weight. To produce washing agent formulations, it is also possible to start with mixtures of the polyacetal described above and one or more of the incrustation inhibitors mentioned.

EXAMPLE 1

In a flask equipped with a stirrer, a water separator and a reflux condenser, 298 g (0.66 mol) of 50% strength aqueous glucoheptonic acid and 47.9 g (0.33 mol) of 40% strength aqueous glyoxal were mixed, and 6.6 g of p-toluenesulfonic acid monohydrate and 350 g of chloroform were then added. The mixture was heated to the reflux temperature with stirring. Using the water separator, the water introduced together with the starting materials and the water formed in the course of the reaction were distilled off azeotropically. In the course of 6 hours, 189 g of water were azeotropically distilled out of the reaction mixture. A precipitate formed in the course of the reaction. After the reaction had ended and the reaction mixture had been cooled down to room temperature, this precipitate was filtered off and subsequently dried at 25° C. under reduced pressure to leave 151 g of a solid product which, by HPLC, contained 1.5% by weight of glucoheptonolactone.

EXAMPLE 2

A flask equipped with a stirrer and a water separator is charged with a mixture of 204 g (0.45 mol) of 50% strength aqueous glucoheptonic acid, 6.1 g of p-toluenesulfonic acid monohydrate and also 11.7 g of 35% strength aqueous sodium palmitinsulfonate (35% strength in water) in 390 g of toluene. The reaction mixture is heated to the boil, so that water is separated off azeotropically. As soon as the mixture begins to boil, 65.3 g (0.45 mol) of 40% strength glyoxal are added in the course of 1 hour while the azeotropic removal of water continues. After a further 3 hours the reaction is complete. The total amount of water which has been separated off is 165 g. The reaction mixture is then cooled, and the polyacetal is filtered off and dried under reduced pressure to leave 125 g of a solid product in which glucoheptonolactone is no longer detectable.

EXAMPLE 3

The apparatus specified in Example 1 is charged with 196.1 g (0.5 mol) of 50% strength aqueous gluconic acid, 72.5 g (0.5 mol) of 40% strength aqueous glyoxal, 15 g of a sodium salt of the sulfuric acid ester of the addition product of 25 mol of ethylene glycol on 1 mol of isooctylphenol (40% strength in water) and 6.4 g of p-toluenesulfonic acid monohydrate in 350 g of toluene. In the course of 7 hours, a total of 167 g of water are distilled off. Removal of the toluene leaves a yellow oily viscous residue which solidifies on drying at reduced pressure (110 g). It contains 4.9% by weight of gluconolactone.

EXAMPLE 4

Example 3 is repeated, except that the glyoxal solution is added dropwise to the mixture in the course of 4 hours and at the same time the water used as solvent and the water formed in the course of the reaction are distilled off azeotropically. 2.5 hours after the addition of glyoxal solution the total amount of water which has been distilled off is 167 g. 101 g are obtained of a solid product in which gluconolactone is not detectable.

EXAMPLE 5

Example 4 is repeated, except that an addition of 39 g of the sodium salt of the sulfuric acid ester of the addition product of 25 mol of ethylene oxide and 1 mol of isooctylphenol (40% strength in water) are used as emulsifier. The amount of water distilled off is 172 g. A solid residue of 115 g is left behind, containing 3.9% by weight of gluconolactone.

EXAMPLE 6

A flask which is equipped with a stirrer and a water separator is charged with 390 g of toluene, 11.6 g of sodium palmitinsulfonate (40% strength in water), 6.4 g of p-toluenesulfonic acid monohydrate and 192.7 g (0.5 mol) of 50.9% strength aqueous gluconic acid. The mixture is thoroughly stirred and heated to the boil. Immediately after the start of boiling 200 g (0.5 mol) of 25% strength aqueous glutardialdehyde solution are added dropwise in the course of 1 hour. 4 hours from the start of refluxing at the boil, 278 g of water has been distilled off azeotropically. The reaction mixture is then cooled down to room temperature, and the precipitate is filtered off with suction and dried at 25° C. under reduced pressure to leave 126 g of a polyacetal in which gluconolactone is no longer detectable.

EXAMPLE 7

Example 6 is repeated, except that instead of gluconic acid 226 g (0.5 mol) of 50% strength aqueous glucoheptonic acid are used. In the course of 6 hours, 296 g of water are distilled off azeotropically. Cooling down, filtration and drying gives 161 g of a solid product containing 1% by weight of gluconolactone.

EXAMPLE 8

The apparatus described in Example 1 is charged with 390 g of toluene, 38.7 g of 40% strength aqueous sodium palmitinsulfonate, 6.4 g of p-toluenesulfonic acid monohydrate, 192.7 g (0.5 mol) of 50.9% strength aqueous gluconic acid and 71.3 g (0.5 mol) of 94% strength terephthaldialdehyde. The reaction mixture is thoroughly stirred and heated to the boil. In the course of 5 hours from the start of boiling, 145 g of water are distilled off azeotropically. Cooling down the reaction mixture, filtering off with suction and drying the resulting precipitate leaves 152 g of polyacetal in which dialdehyde and gluconic acid are no longer detectable.

EXAMPLE 9

In the apparatus described in Example 1, 196 g (0.5 mol) of 50% strength aqueous gluconic acid, 72.6 g (0.5 mol) of 40% strength aqueous glyoxal, 9.8 g of p-toluenesulfonic acid monohydrate and 370 g of chloroform are mixed. The mixture is thoroughly stirred and heated at the boil for 8 hours, during which a total of 155 g of water are separated off azeotropically. The reaction mixture is then cooled down, the solids are allowed to settle, and the chloroform is decanted off. The residue is dried at 25° C. under reduced pressure to leave 115 g of polyacetal in which gluconic acid is no longer detectable.

EXAMPLE 10

In the apparatus described in Example 1, a mixture of 235.2 g (0.6 mol) of 50% strength aqueous gluconic acid, 43.5 g (0.3 mol) of 40% strength glyoxal, 5.0 g of p-toluenesulfonic acid monohydrate and 390 g of toluene is heated to the boil with stirring. In the course of 4 hours, 151 g of water are distilled off azeotropically. The reaction mixture is then cooled down, and the finely divided residue is filtered off and dried under reduced pressure to leave 121 g of a polyacetal containing 4.2% by weight of gluconolactone.

EXAMPLE 11

In a flask which is equipped with two dropping funnels, a stirrer and a water separator, a solution of 5.0 g of p-toluenesulfonic acid monohydrate in 370 g of toluene is heated to the boil and subsequently 235.2 g (0.6 mol) of 50% strength aqueous gluconic acid on the one hand and 43.5 g (0.3 mol) of 40% strength aqueous glyoxal on the other are simultaneously added dropwise in the course of 1.5 hours. 3.5 hours after the addition of gluconic acid and glyoxal the amount of water removed by azeotropic distillation is 154 g. The reaction mixture is then cooled down to room temperature, and the precipitate is filtered off and dried to leave 115 g of a solid product which still contains 3.5% of gluconolactone.

EXAMPLE 12

Example 9 is repeated, except that the use of chloroform is dispensed with. The water initially used as solvent and the water formed in the course of the reaction are distilled off at 400 mbar and 100° C. This serves to produce 125 g of polyacetal containing 8.3% of gluconic acid. To remove the catalyst from the polyacetal, the residue is dispersed in methanol, then filtered off and dried at 25° C. under reduced pressure to leave 112 g of polyacetal.

APPLICATION EXAMPLES

Methods of measurement

A. Determination of the iron complexing capacity/iron hydroxide dispersing capacity The inhibiting action of complexing agents or dispersants on the precipitation of iron(III) hydroxide is determined by turbidimetric titration. The substance under investigation is introduced first and, in alkaline solution, titrated with iron(III) chloride solution until turbid.

The titration is carried out with the aid of a Titroprozessor automat by measuring the light transmittance of the solution with a light guide photometer. Titration by hand is not advisable, since, in the course of the titration, the solutions usually become highly discolored and, as a result, the onset of turbidity is difficult to see.

The degree of discoloration (caused by colloidally dispersed iron hydroxide) provides an indication of the dissociation tendency of the complex formed. A rough measure thereof is the gradient of the titration curve before the equivalence point is reached. This gradient is measured in % transmission/ml of $FeCl_3$ solution. The reciprocal values thus indicate the concentration of the complex.

The equivalence point appears as a break in the titration curve. Complexing agents having a dispersing action show two break points, of which the second is usually less pronounced. Pure dispersants show a less clearly defined break point; substances of this kind, on addition of the customary maximum volumes of $FeCl_3$ solution (50 ml of 0.05 molar $FeCl_3$ solution), produce no equivalence point and hence no evaluable titration curve. Substances which show this behavior are labeled in the Table as "dispersant".

1 mmol of the substance under investigation is dissolved in 100 ml of distilled water. The solution is brought to pH 10 with 1N NaOH and is maintained at that value throughout the titration. Titration takes place at room temperature or at 60° C. via the 0.05M $FeCl_3$ solution at a rate of 0.4 ml/min.

The complexing or dispersing capacity is expressed as:

$$\text{mol of Fe/mol of } AS^{(1)} = \frac{\text{ml of FeCl}_3 \text{ solution consumed}}{20}$$

or $$\text{mg of Fe/g of } AS = \frac{\text{ml of FeCl}_3 \text{ solution consumed}}{MW_{AS}} \times 2790$$

$^{(1)}AS$ = active substance

The results are shown in the Table.

B. Test of sodium perborate stabilization in wash Liquors Principle

The hydrogen peroxide responsible for the bleaching action in washing agent formulations which contain sodium perborate is catalytically decomposed by heavy metal ions (Fe, Cu, Mn). This decomposition can be prevented by complexing the heavy metal ions. The peroxidestabilizing action of a complexing agent is tested in terms of the residual peroxide content left on storing a heavy metal containing wash liquor at elevated temperature.

The hydrogen peroxide content is determined before and after storage by titration with potassium permanganate in acid solution.

The test is performed with two washing agent formulations:

(A) Phosphate-containing formulation
  Composition (in % by weight):
  19.3% of sodium $C_{12}$-alkylbenzenesulfonate
  15.4% of sodium perborate
  30.8% of sodium triphosphate
  2.6% of acrylic acid/maleic acid copolymer of molecular weight 70,000
  31.0% of sodium sulfate
  0.9% of polyacetal (B) Reduced phosphate formulation
  Composition (in % by weight):
  15% of sodium $C_{12}$-alkylbenzenesulfonate
  5% of the addition product of 1 mol of tallow fat alcohol on 11 mol of ethylene oxide
  20% of sodium perborate
  6% of sodium metasilicate
  1.25% magnesium silicate
  20% of sodium triphosphate
  31.75% of sodium sulfate
  1% of polyacetal Formulations (A) and (B) were each used to prepare wash liquors by dissolving said formulations (A) and (B) in water of 25° German hardness. The concentration of (A) in wash liquor (A) is 6.5 g/l and the pH is 8.15; the concentration of (B) in wash liquor (B) is 8 g/l, and the pH is 10.1. To test the perborate stabilization, a mixture of 2 ppm of $Fe^{3+}$, 0.25 ppm of $Cu^{2+}$ and 0.25 ppm of $Mn^{2+}$ ions in the form of an aqueous solution is added to each of wash liquors (A) and (B), and wash liquor (A) is stored for 2 hours at 80° C. and wash liquor (B) for 2 hours at 60° C.

C. Test of incrustation inhibition by turbidity measurement

Principle

Wash liquors, if stored at elevated temperature, become cloudy or turbid due to the precipitation of sparingly soluble washing agent constituents. The final turbidity after 2 hours is a measure of the precipitation-preventing activity of an incrustation inhibitor.

The test is carried out with a phosphate-free model wash liquor which is prepared with 6.5 g/l of washing agent and has the following composition:
  2 7% of sodium $C_{12}$-alkylbenzenesulfonate
  3.3% of addition product of 25 mol of ethylene oxide on 1 mol of tallow fat alcohol
  10.8% of Na metasilicate
  27% of sodium carbonate
  2.1% of CMC
  1.8% of acrylic acid/maleic acid copolymer of molecular weight 70,000
  9.2% of polyacetal
  43.1% of $Na_2SO_4$ The model wash liquor is stored at elevated temperature in water of 22.4° German hardness for a period of 2 hours, whereafter the turbidity is determined nephelometrically on a scale where low turbidity values in terms of NTU units signify highly the effective products while high values indicate products of limited efficacy. D. Determination of the calcium binding power:

1 g of active substance is dissolved in 10 ml of 10% strength sodium carbonate, and the solution is brought to pH 11 with 1N NaOH. While the pH is then kept constant, the solution is titrated with 0.35M calcium acetate solution to the onset of turbidity.

OHC—$A_n$—CHO where
A=

—$CH_2$—, —$CH_2$—$CH_2$—, —$CH_2$—$CH_2$—$CH_2$—,

—$CH_2$—$CH_2$—$CH_2$—$CH_2$—, —$CH_2$—CH—$CH_2$— or
$\phantom{-CH_2-CH_2-CH_2-CH_2-, -CH_2-}$|
$\phantom{-CH_2-CH_2-CH_2-CH_2-, -CH_2-}CH_3$

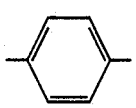

TABLE

| Polyacetal prepared as in Example No. | Calcium binding power mg of Ca/g of AS at 20° C. pH 11 | IRON Complexing or dispersing | | | Perborate stabilization in washing agent formulation [in %] | | Action as incrustation inhibitor [NTU units] |
|---|---|---|---|---|---|---|---|
| | | mol of Fe / mol of AS | mg of Fe / g of AS | % transmission (at break point) ml of FeCl₃ solution | (A) | (B) | |
| 1 | 10 | "dispersant" | — | — | — | 32.7 | 140 |
| 2 | 30 | "dispersant" | — | — | 33.1 | 58.6 | 180 |
| 3 | 65 | "dispersant" | — | — | 29.6 | 59.6 | 260 |
| 4 | | 0.42 | 108 | 4.4 | 24.4 | 46.8 | |
| 5 | | 0.34 | 87 | 5.8 | 23.7 | 44.8 | 255 |
| 6 | 25 | "dispersant" | — | — | 34.1 | 58.6 | |
| 7 | 20 | "dispersant" | — | — | 30.6 | 59.1 | 115 |
| 9 | 10 | 1.5 | 269 | 25.5 | 33.3 | 33.7 | 170 |
| 10 | 15 | 1.27 | 140 | 14.3 | 35.5 | 30.7 | 295 |
| 11 | 15 | 1.14 | 126 | 9.7 | 36.8 | 31.7 | 140 |
| without builder | 0 | 0 | 0 | | 21.0 | 28.5 | 260 |

We claim:

1. A polyacetal obtainable by reaction of
(a) a dialdehyde of the formula

OHC—$A_n$—CHO where
A is

—$CH_2$—, —$CH_2$—$CH_2$—, —$CH_2$—$CH_2$—$CH_2$—, $\phantom{-CH_2-CH_2-CH_2-CH_2-, -CH_2-}CH_3$
$\phantom{-CH_2-CH_2-CH_2-CH_2-, -CH_2-}$|
—$CH_2$—$CH_2$—$CH_2$—$CH_2$—, —$CH_2$—CH—$CH_2$— or

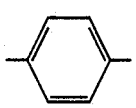

and
n is 0 or 1, with
(b) a polycarboxylic acid of 5 to 7 carbon atoms which contains not less than 3 OH groups,
in a molar ratio (a):(b) of 1:0.25 to 4 in an aqueous medium in the presence of an acid catalyst.

2. A process for preparing a polyacetal as claimed in claim 1, wherein
(a) a dialdehyde of the formula OHC—$A_n$—CHO where A is as defined in claim 1,

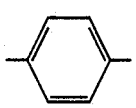

and
n is 0 or 1, is reacted with
(b) a polycarboxylic acid of 5 to 7 carbon atoms which contains not less than 3 OH groups,
in a molar ratio (a):(b) of 1:0.25 to 4 in an aqueous medium at up to 140° C. in the presence of an acid catalyst and water is removed from the reaction mixture.

3. A process as claimed in claim 2, wherein components (a) and (b) are reacted in a molar ratio of 1:0.5 to 2 at from 60° to 110° C.

4. A process as claimed in claim 2, wherein component (a) is glyoxal, glutardialdehyde, terephthaldialdehyde or a mixture thereof.

5. A process as claimed in claim 2, wherein component (b) is gluconic acid and/or glucoheptonic acid.

6. A process as claimed in claim 2, wherein the reaction is carried out in the presence of an inert organic solvent in which the polyacetal is insoluble.

7. A process as claimed in claim 6, wherein the reaction is additionally carried out in the presence of a water-in-oil emulsifier.

* * * * *